W. R. VAN HOUSEN & H. A. BOWER.
CAR TRUCK SIDE FRAME.
APPLICATION FILED NOV. 16, 1911.
1,044,305.
Patented Nov. 12, 1912.
2 SHEETS—SHEET 1.
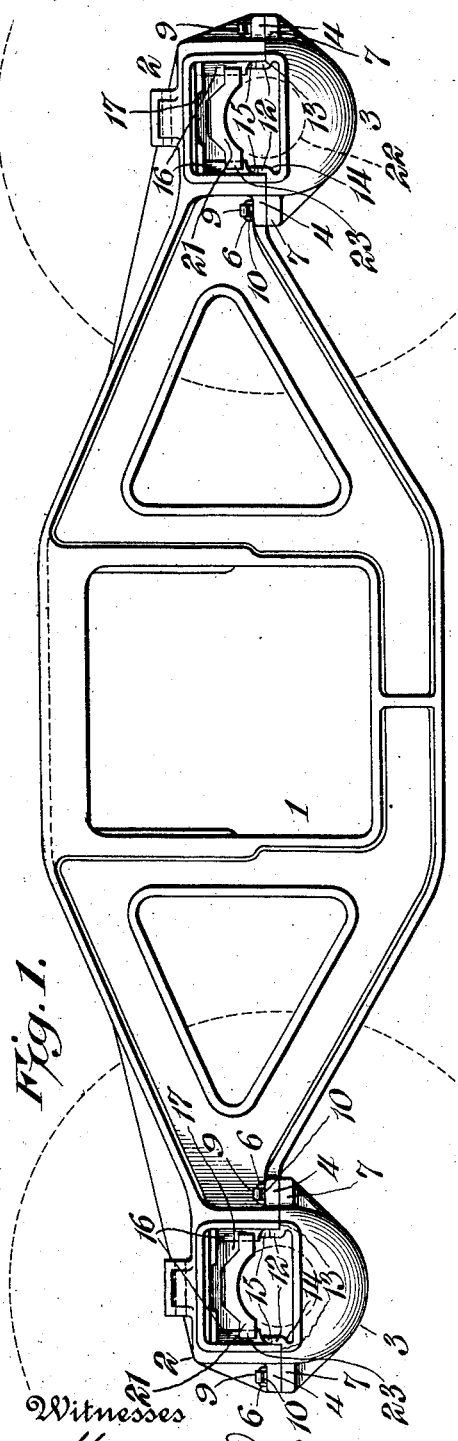
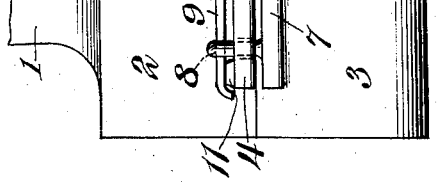
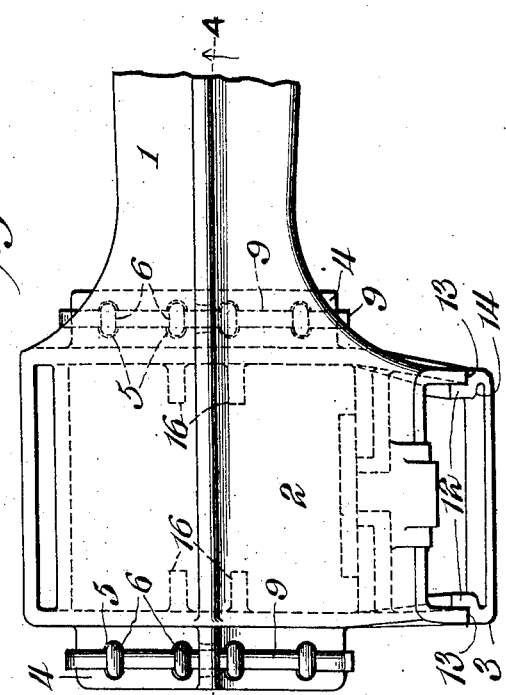
W. R. Van Housen
and H. A. Bower, Inventors
Witnesses

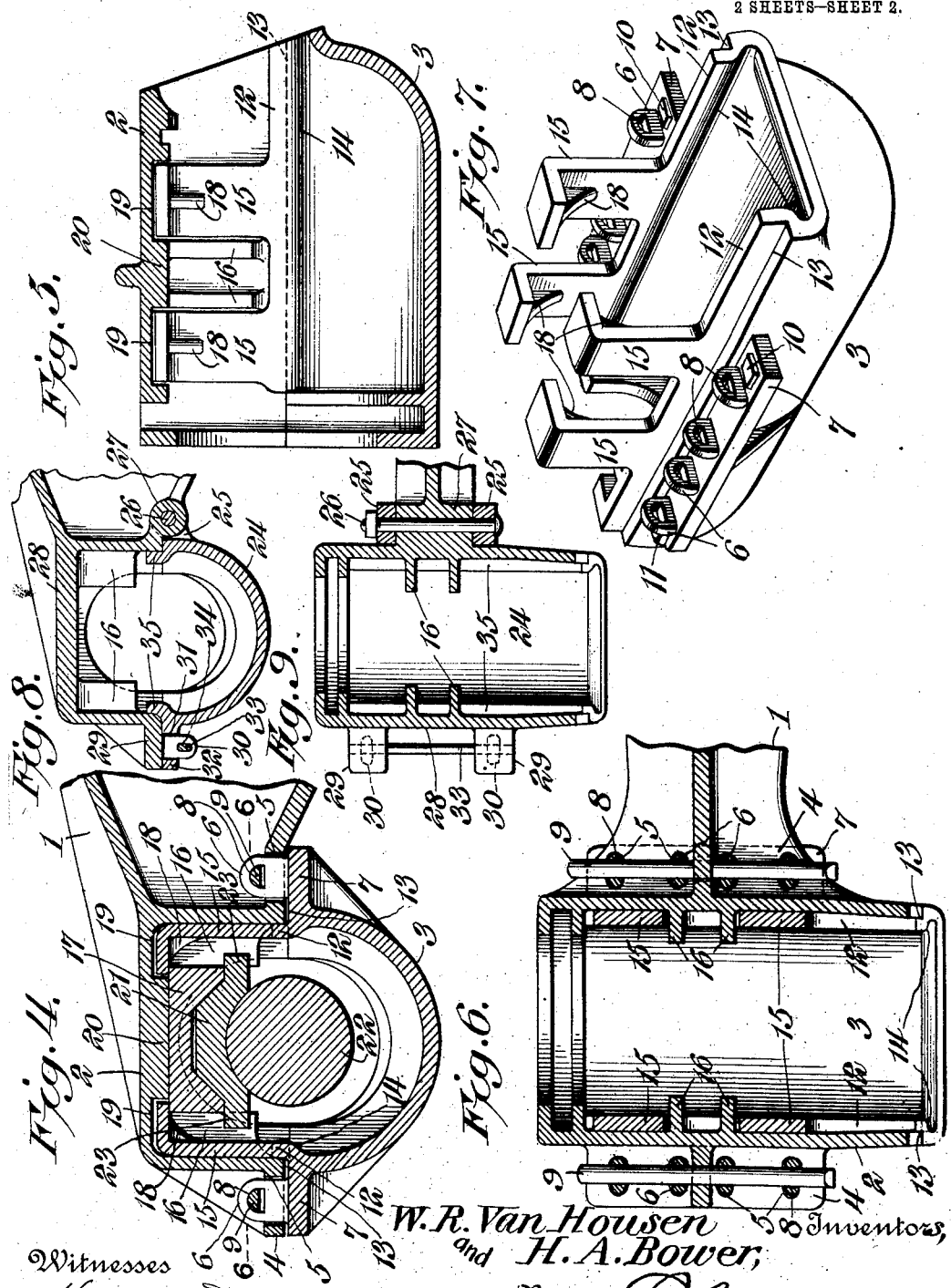

UNITED STATES PATENT OFFICE.

WILLIAM R. VAN HOUSEN AND HIRAM A. BOWER, OF ERWIN, TENNESSEE.

CAR-TRUCK SIDE FRAME.

1,044,305.  Specification of Letters Patent.  Patented Nov. 12, 19__.

Application filed November 16, 1911. Serial No. 660,713.

*To all whom it may concern:*

Be it known that we, WILLIAM R. VAN HOUSEN and HIRAM A. BOWER, citizens of the United States, residing at Erwin, in the county of Unicoi and State of Tennessee, have invented certain new and useful Improvements in Car-Truck Side Frames, of which the following is a specification.

The invention relates to improvements in car truck side frames.

The object of the present invention is to simplify and reduce the cost of the construction of car truck side frames equipped with journal boxes, and to provide a car truck side frame having a divided journal box with a removable oil cellar section, adapted when detached to permit the wheels to be applied to and removed from a truck without disturbing or interfering with the other portions of the latter.

A further object of the invention is to provide a car truck side frame of this character in which the removable oil cellar section of the journal box will be securely retained in place and effectually prevented from becoming lost, whereby the axle may be maintained in a lubricated condition so as to avoid all liability of accidents resulting from the wringing or twisting off of the journals caused by excessive heat on account of an absence of lubrication.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a car truck side frame provided with journal boxes, constructed in accordance with this invention. Fig. 2 is a plan view of one end of the car truck side frame. Fig. 3 is an end elevation of the same. Fig. 4 is a vertical sectional view, taken transversely of the journal box on the line 4—4 of Fig. 2. Fig. 5 is a central vertical sectional view, taken longitudinally of the journal box. Fig. 6 is a horizontal sectional view on the line 6—6 of Fig. 4. Fig. 7 is a detail perspective view of the lower or oil cellar section of the journal box. Fig. 8 is a transverse sectional view of a divided journal box, illustrating another embodiment of the invention. Fig. 9 is a horizontal sectional view of the same.

Like numerals of reference designate corresponding parts in all the figures of the drawings.

In the accompanying drawings in which is illustrated the preferred embodiment of the invention, 1 designates a car truck side frame, provided at each end with a journal box divided near the center and consisting of upper and lower sections 2 and 3, the upper section 2 being cast or otherwise formed integral with the car truck side frame, and the lower or oil cellar section being detachably secured to the upper section and adapted to be removed to permit an axle to be applied to and removed from a truck without disturbing the other portions of the same. The upper integral section or portion, which is approximately inverted U-shape, is composed of spaced sides and a connecting top portion, and it is provided at the lower edges of the sides with integral horizontal ledges 4, having apertures 5 for the reception of vertical lugs 6, arranged in series at opposite sides of the lower oil cellar section, and projecting upwardly from integral horizontal flanges 7, which extend longitudinally of the lower oil cellar section of the journal box adjacent to the upper edges of the side walls of the same. The lower oil cellar section, which is approximately semi-cylindrical, is similar in configuration to the lower oil cellar portion of the standard journal box, and the vertical lugs 6 at opposite sides of the oil cellar section are provided with alined openings 8 for the reception of taper keys 9, which are supported upon lugs or bosses 10 and 11, projecting upwardly from the ledges 4 at the ends thereof. The lugs or bosses 11 at one end of the ledges extend above the plane of the lugs or bosses 10 at the other end of the ledges to receive the smaller end of the wedge-shaped key, which is adapted to be driven into the openings of the upwardly projecting lugs 6 to firmly and securely fasten the lower oil cellar section of the journal box to the upper section thereof. After the wedges have been driven into position to draw the lower section tightly against the upper section, their ends may be bent over, as shown, to prevent them from working loose. Instead of the lugs 8 being formed integral with the horizontal flange, the flange or ledge 4 of the upper section may be provided with lugs to extend through the flange of the lower section in the manner shown at the outer side of the journal box, illustrated in Fig. 9 of the drawings.

The lower oil cellar section is provided at opposite sides with inwardly off-set upwardly projecting flanges 12, extending along the sides of the lower oil cellar section and forming exterior recesses 13 to receive the lower edges of the side walls of the upper section of the journal box, and providing inwardly projecting over-hanging shoulders 14 and extending above the meeting edges or faces of the upper and lower sections. The upwardly extending side flanges, which fit against the inner faces of the side walls of the upper section, are adapted to prevent the oil from working out of the box, and they exclude dust, dirt and other foreign substance, and they also operate to hold the lower cellar section in proper position with relation to the upper section of the journal box, and will maintain the oil cellar section in such position even should the supporting lugs or members be free to move in the openings of the side ledges of the upper section. The lower section of the journal box is also provided with upwardly extending approximately L-shaped arms 15, located at opposite sides of the inwardly projecting journal bearing engaging flanges 16 and fitting against the inner faces of the side walls of the upper section and extending inwardly at the top of the latter and projecting over the journal wedge 17 so as to be supported by the same. The L-shaped arms 15, which are strengthened by integral webs 18, have their vertical portions arranged in the planes of the side flanges 12 and formed integral therewith, and the said arms are adapted to retain the oil cellar section in position and will prevent the same from dropping down and becoming lost even should the supporting lugs become broken or the wedge-shaped keys become lost. The inwardly extending top portions of the L-shaped arms are received in recesses 19 in the top wall or portion of the upper section of the journal box, which extends inwardly from the side walls to a short distance over the journal wedge 17, as clearly illustrated in Fig. 4 of the drawings, the top wall of the upper section of the journal box having the solid intermediate portion 20 to fit the upper face of the journal wedge. The arms 15 by being located at opposite sides of the flange 16 are also adapted to retain the lower cellar section against longitudinal displacement should the keys become lost or the attaching lugs 8 become broken. The journal bearing 21 is arranged upon the journal 22 and is provided with laterally projecting lugs or portions 23, which engage between the vertical flanges 16 of the upper section of the journal box in the usual manner.

The journal box will permit the use of a lid and will permit the contained parts to be constructed in accordance with the Master Car Builders' requirements. As the journal box is divided at or near the center there is no stress or strain upon the lower oil cellar section except that incident to its own weight and the weight of the contents. By eliminating all bolts and nuts to cause inside inspection the liability to overlook existing defects is reduced. Also there is a reduction in foundry cost from that of a cast car truck side frame having an integral journal box.

In Figs. 8 and 9 of the drawings, the lower oil cellar section 24 is equipped at the inner side with projecting lugs 25, provided with perforations for the reception of a pintle 26, which passes through corresponding lugs 27, formed on the car truck side frame and fitting against the said lugs or ears 25. By this construction, the lower oil cellar section of the journal box is hinged to the upper section 28 and is adapted to swing downwardly and inwardly out of the way when the outer side of the lower oil cellar section is disconnected from the upper section of the journal box. The upper section 28 of the journal box is provided at the outer side with horizontal ledges or flanges 29, and it has integral depending lugs 30, adapted to extend through apertures 31 of horizontal flanges 32, projecting from the upper side of the lower oil cellar section of the journal box and engaged by a key 33, which is driven through alined openings 34 of the depending lugs 30. The lugs 30, however, may be formed on the lower section and may extend through a horizontal ledge or flange of the upper section of the journal box in the manner heretofore described. The lower oil cellar section 24 of the journal box is provided at opposite sides with upwardly projecting flanges 35, constructed similar to the side flanges 12, heretofore described, and fitting within the upper section of the journal box and adapted to retain the lubricant therein and to form a dust tight joint.

Having thus fully described our invention, what we claim as new and desire to secure by Letters Patent, is:—

1. A car truck side frame provided with a horizontally divided journal box, the upper section being formed integral with the side frame, horizontal flanges projecting from the upper and lower sections at the division line thereof, one of the flanges being provided with an aperture, a lug extending from the other flange and projecting through the aperture and having an opening, and a key driven into the opening of the lug and securing the sections of the journal box together.

2. A car truck side frame provided with a divided journal box composed of upper and lower sections, the upper section being formed integral with the side frame and the lower section being provided at opposite sides with upwardly projecting flanges extending along the sides of the said lower section and inwardly offset from the plane of the side walls thereof and projecting above the meeting edges of the said sections and fitted against the inner faces of the side walls of the upper section to form a dust tight joint and to prevent the escape of a lubricant, and means for detachably securing the lower section to the upper section.

3. A car truck side frame provided with a divided journal box composed of upper and lower sections, the upper section being formed integral with the side frame, and the lower section being provided at opposite sides with upwardly projecting flanges fitting against the inner faces of the sides of the upper section and extending above the meeting edges or faces of the sections to form a tight joint and to prevent lateral displacement of the lower section, upper and lower exterior flanges formed integral with the sections of the journal box and located at the dividing line of the same, one of the flanges being provided with an aperture, and a lug projecting from the other flange and extending through the said aperture and having an opening to receive a key for detachably securing the sections together.

4. A car truck side frame provided with a divided journal box composed of upper and lower sections, the upper section being formed integral with the side frame and provided at opposite sides with horizontal ledges having apertures, horizontal flanges formed integral with the lower section and each provided with a series of upwardly projecting lugs having horizontally alined openings and extending through the apertures of the said ledges, and keys extending through the openings of the lugs and securing the sections of the journal box together.

5. A car truck side frame having a divided journal box composed of upper and lower sections, a horizontal ledge extending from the upper section and having a series of apertures and provided at its upper face with projecting bosses of different heights, a longitudinal flange formed integral with and extending from the lower section of the journal box and provided with upwardly projecting lugs adapted to be passed through the apertures of the said ledge and having alined openings, and a tapered key arranged in the alined openings of the lugs and engaging the said bosses.

6. A car truck side frame provided with a divided journal box composed of upper and lower sections, exteriorly located fastening means for securing the sections together, and interiorly arranged means carried by the lower section and adapted to engage over the journal wedge for supporting the lower section should the said fastening means become lost or broken.

7. A car truck side frame provided with a divided journal box composed of upper and lower sections, fastening means for securing the sections together, and an arm formed integral with the lower section and extending upwardly into the upper section and arranged to project over and be supported by the journal wedge.

8. A car truck side frame provided with a divided journal box composed of upper and lower sections, the upper section being formed integral with the side frame and provided at opposite sides with journal bearing engaging flanges, fastening means for securing the lower section to the upper section, and arms formed integral with the lower section and arranged in pairs and receiving the said flanges between them and adapted to extend over the journal wedge to form a support for the lower section of the journal box.

9. A car truck side frame provided with a divided journal box composed of upper and lower sections, the upper section being formed integral with the side frame and provided at the top with a solid intermediate portion and having recesses at opposite sides thereof, and opposite arms carried by the lower section of the journal box and extending upwardly into the upper section and having projecting portions arranged in the said recesses and adapted to engage over the journal wedge to form a support for the said lower section of the journal box.

In testimony whereof we affix our signatures in presence of two witnesses.

WILLIAM R. VAN HOUSEN.
HIRAM A. BOWER.

Witnesses:
H. F. STALEY,
W. S. MOSELEY.

---

Copies of this patent may be obtained for five cents each, by addressing the "Commissioner of Patents, Washington, D. C."